United States Patent
Beale

(10) Patent No.: US 7,340,713 B2
(45) Date of Patent: Mar. 4, 2008

(54) METHOD AND APPARATUS FOR DETERMINING A PROXIMITY CORRECTION USING A VISIBLE AREA MODEL

(75) Inventor: Daniel F. Beale, Portland, OR (US)

(73) Assignee: Synopsys, Inc., Mountian View, CA (US)

( * ) Notice: Subject to any disclaimer, the term of this patent is extended or adjusted under 35 U.S.C. 154(b) by 0 days.

(21) Appl. No.: 11/357,304

(22) Filed: Feb. 17, 2006

(65) Prior Publication Data

US 2006/0143590 A1  Jun. 29, 2006

Related U.S. Application Data

(63) Continuation-in-part of application No. 10/955,189, filed on Sep. 29, 2004, now Pat. No. 7,207,029, and a continuation-in-part of application No. 10/955,532, filed on Sep. 29, 2004, now Pat. No. 7,234,129, and a continuation-in-part of application No. 11/139,390, filed on May 27, 2005, now Pat. No. 7,228,522.

(51) Int. Cl.
*G06F 17/50* (2006.01)

(52) U.S. Cl. ............................................. 716/21; 716/4
(58) Field of Classification Search .................... 716/9, 716/19, 4, 21
See application file for complete search history.

(56) References Cited

U.S. PATENT DOCUMENTS

| | | | | |
|---|---|---|---|---|
| 5,392,222 A | * | 2/1995 | Noble | 716/19 |
| 6,127,071 A | * | 10/2000 | Lu | 430/5 |
| 6,329,107 B1 | * | 12/2001 | Lu | 430/5 |
| 6,425,117 B1 | * | 7/2002 | Pasch et al. | 716/21 |
| 6,625,801 B1 | * | 9/2003 | Pierrat et al. | 716/19 |
| 6,629,292 B1 | * | 9/2003 | Corson et al. | 716/3 |
| 6,670,081 B2 | * | 12/2003 | Laidig et al. | 430/5 |
| 6,684,382 B2 | * | 1/2004 | Liu | 716/19 |
| 6,687,885 B2 | * | 2/2004 | Ono | 716/5 |
| 6,871,338 B2 | * | 3/2005 | Yamauchi | 716/19 |
| 6,892,367 B2 | * | 5/2005 | Palusinski et al. | 716/5 |
| 7,003,757 B2 | * | 2/2006 | Pierrat et al. | 716/19 |
| 7,065,729 B1 | * | 6/2006 | Chapman | 716/13 |
| 7,131,104 B2 | * | 10/2006 | Gallatin et al. | 716/19 |
| 2002/0028393 A1 | * | 3/2002 | Laidig et al. | 430/5 |
| 2004/0003357 A1 | * | 1/2004 | Palusinski et al. | 716/5 |
| 2005/0257187 A1 | * | 11/2005 | Gallatin et al. | 716/21 |
| 2006/0002603 A1 | * | 1/2006 | Beauchaine et al. | 382/141 |
| 2006/0080634 A1 | * | 4/2006 | Beale | 716/21 |
| 2006/0143590 A1 | * | 6/2006 | Beale | 716/19 |
| 2006/0236296 A1 | * | 10/2006 | Melvin et al. | 716/20 |

* cited by examiner

*Primary Examiner*—Phallaka Kik
*Assistant Examiner*—Patrick Sandoval
(74) *Attorney, Agent, or Firm*—Park, Vaughan & Fleming LLP

(57) ABSTRACT

One embodiment of the present invention provides a system that determines a proximity correction for an integrated circuit layout. During operation, the system receives a layout. Next, the system receives an evaluation point within the layout. The system then determines a visible area associated with the evaluation point. Next, the system determines a proximity correction using the visible area.

14 Claims, 7 Drawing Sheets

METHOD AND APPARATUS FOR DETERMINING A PROXIMITY CORRECTION USING A VISIBLE AREA MODEL

RELATED APPLICATION

This application is a continuation-in-part of, and hereby claims priority under 35 U.S.C. § 120 to, U.S. patent application Ser. No. 10/955,189, now U.S. Pat. No. 7,207,029 entitled, "CALCULATING ETCH PROXIMITY-CORRECTION USING IMAGE-PRECISION TECHNIQUES," by inventors Dan Beale, Jim Shiely, and John Stirniman, filed on 29th Sep. 2004. This application is also a continuation-in-part of, and hereby claims priority under 35 U.S.C. § 120 to, U.S. patent application Ser. No. 10/955,532, now U.S. Pat. No. 7,234,129 entitled, "CALCULATING ETCH PROXIMITY-CORRECTION USING OBJECT-PRECISION TECHNIQUES," by inventors Dan Beale, Jim Shiely, and John Stirniman, filed on 29th Sep. 2004. Additionally, this application is a continuation-in-part of, and hereby claims priority under 35 U.S.C. § 120 to, U.S. patent application Ser. No. 11/139,390, now U.S. Pat. No. 7,228,522 entitled, "EDGE-BASED PROXIMITY CORRECTION," by inventor Daniel Beale, filed on 27th May 2005.

BACKGROUND

1. Field of the Invention

This invention relates to integrated circuit design. More specifically, the invention relates to a method and an apparatus to determine a proximity correction using a visible area model.

2. Related Art

The relentless miniaturization of integrated circuits has been a key driving force behind recent advances in computer technology. This miniaturization has been made possible by a number of technologies, such as OPC (Optical Proximity Correction). OPC uses process models to determine proximity corrections which allow the system to generate the desired feature shapes on the wafer. The accuracy of these process models is becoming increasingly important as semiconductor integration densities continue to increase at an exponential rate.

A process model models the behavior of one or more semiconductor manufacturing processes which typically involve complex physical and chemical interactions. Since it is almost impossible to find exact analytical formulae to predict the behavior of these complex interactions, statistical models are usually used to model these processes.

Once these statistical process models are found, they can be used to make corrections to layouts to compensate for undesirable effects of a semiconductor manufacturing process. Since corrections are typically computed based on nearby features, these correction techniques are usually called proximity correction techniques. Proximity correction techniques can be used for any semiconductor manufacturing process whose effect can be predicted (or simulated) using statistical models.

For example, optical proximity correction techniques can be used to compensate for the idiosyncrasies of a lithography process by correcting the polygons in a layout. The corrected layout can then be used to generate the desired feature shapes on the wafer.

Prior art techniques for proximity correction typically use a process model that linearly superimposes contributions from neighboring polygons. A neighboring polygon's contribution at an evaluation point is typically computed by convolving a statistical process model with the polygon. These linear-convolution based proximity correction techniques are sufficiently accurate at large feature dimensions. However, these techniques are largely insensitive to the specific positioning of polygons relative to one another.

Unfortunately, as semiconductor integration densities continue to increase at an exponential rate, it is becoming increasingly difficult to use linear-convolution based techniques to perform proximity correction effectively.

Hence what is needed is a method and an apparatus to determine a proximity correction, especially when the proximity effects depend (partially or fully) on the relative positions of polygons.

SUMMARY

One embodiment of the present invention provides a system that determines a proximity correction for an integrated circuit layout. During operation, the system receives a layout. Next, the system receives an evaluation point within the layout. The system then determines a visible area associated with the evaluation point. Next, the system determines a proximity correction using the visible area.

In a variation on this embodiment, the system determines the visible area by first casting rays from the evaluation point. In one embodiment, the system casts the rays at uniform angular increments from the evaluation point. Next, the system constructs pie-wedges using the rays. The system then determines the visible area using the pie-wedges.

In a variation on this embodiment, the system casts rays by first extending a ray from the evaluation point until the ray intersects a polygon's edge. Next, the system determines an extension point along the ray by proceeding into the polygon by an extinction distance. If the extension point is inside the polygon, the system terminates the ray at the intersection point between the ray and the polygon's edge. Otherwise, if the extension point is outside the polygon, the system extends the ray beyond the extension point.

In a variation on this embodiment, the system determines the visible area by computing a surface integral of a statistical function over the pie-wedges.

In a variation on this embodiment, the visible area associated with the evaluation point is the area within the layout that is visible from the evaluation point. Specifically, a point in the layout is visible from the evaluation point if a straight line between the point and the evaluation point does not overlap with a polygon over a distance that is greater than an extinction length.

One embodiment of the present invention provides a system that determines a proximity correction for an integrated circuit layout which is represented using a pixel-map. During operation, the system receives a pixel-map layout. Next, the system receives a location of an evaluation pixel within the pixel-map layout. The system then determines a visible area associated with the evaluation pixel by applying a non-linear filter to the pixel-map layout. Next, the system determines a proximity correction using the visible area.

In a variation on this embodiment, the system applies the non-linear filter to the pixel-map layout by first scanning the layout to determine a set of visible pixels from the evaluation pixel. The system then determines the visible area by computing a weighted sum of the set of visible pixels.

DETAILED DESCRIPTION

Integrated Circuit Design Flow

Figure 1:
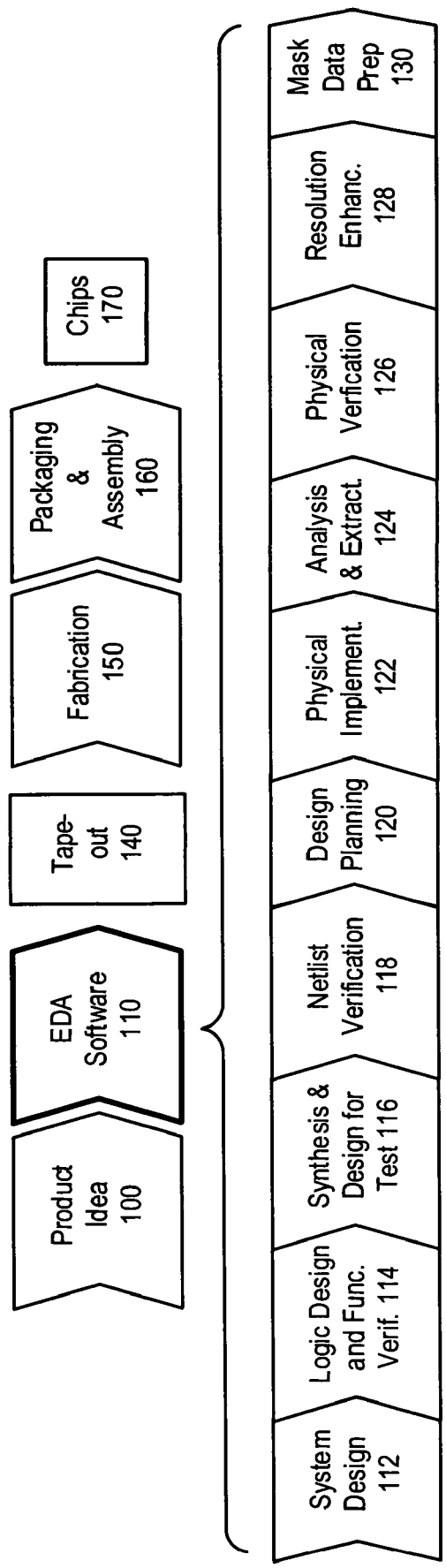
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): The designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare® Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include Astro-Rail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above described steps. Specifically, one embodiment of the present invention can be used during the resolution enhancement step 128.

Proximity Correction

Figure 2A:
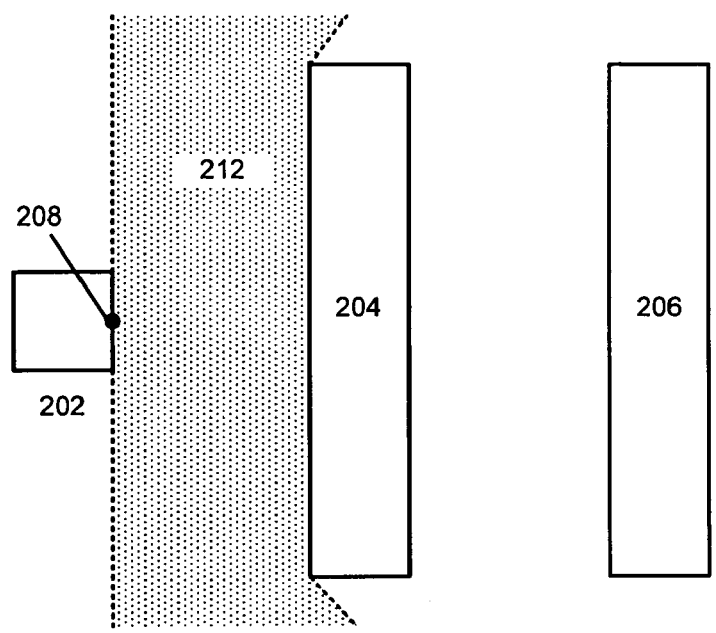
FIGS. 2A and 2B illustrate how proximity correction can depend on the relative positions of polygons in accordance with an embodiment of the present invention.
Figure 2B:
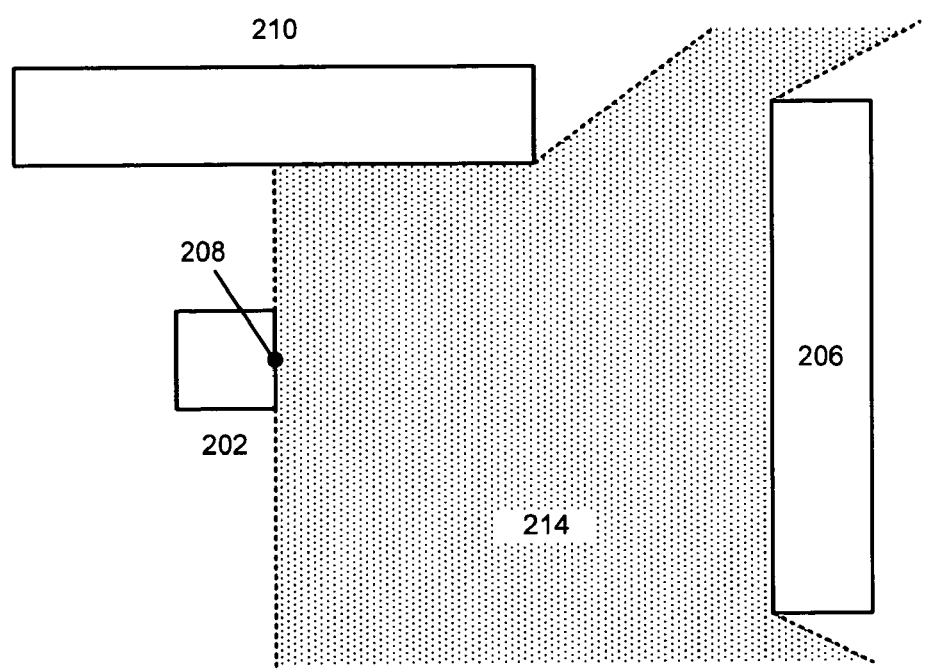

FIGS. 2A and 2B illustrate how proximity correction can depend on the relative positions of polygons in accordance with an embodiment of the present invention.

FIG. 2A illustrates a portion of a layout containing polygons 202, 204, and 206. The proximity correction at evaluation point 208 on polygon 202 can be determined by superimposing contributions from polygons 204 and 206.

FIG. 2B illustrates a portion of a layout that is essentially the same as FIG. 2A, except that polygon 204 has been replaced by polygon 210, which is a rotated version of polygon 204. Furthermore, polygon 210 has been positioned so that the distance between a point on polygon 210 and evaluation point 208 is the same as the distance between a corresponding point on polygon 204 and evaluation point 208.

Consider the case in which the proximity effect at the evaluation point depends on the trench width, which corresponds to the open area visible from the evaluation point.

In FIG. 2A, area 212 is visible from evaluation point 208. The area between polygons 204 and 206 is not part of the visible are because it is occluded by polygon 204. On the other hand, in FIG. 2B, polygon 210 does not occlude polygon 206, resulting in visible area 214.

Linear-convolution based techniques usually do not model this situation accurately. Specifically, prior art techniques based on linear-convolution usually do not capture the fact that, in FIG. 2A, polygon 206 is occluded by polygon 204, and hence it may not contribute to the proximity effect, whereas in FIG. 2B, polygon 206 is not occluded by polygon 210, and hence it may contribute to the proximity effect. This is because linear-convolution based techniques typically superimpose the individual contributions of neighboring polygons. Hence, in linear-convolution based approaches, polygon 206 would likely have the same contribution in FIG. 2A as in FIG. 2B.

Unfortunately, the effects of some semiconductor manufacturing processes directly depend on the relative positions of these polygons. As a result, the proximity correction required at evaluation point 208 may be very different for the layouts shown in FIG. 2A and FIG. 2B. In such situations, it can be very difficult (if not impossible) to use prior art proximity correction techniques to accurately model and compensate for such effects.

For example, photolithography typically involves many physical and chemical processes, including resist bake and diffusion of photoactive compounds. Hence, photolithography can exhibit proximity effects that cannot be accounted for by linearly superimposing polygon contributions.

Even if the proximity model contains terms that compute the effect of interference between multiple polygons, it is unlikely that such a model will be able to accurately model the effect of the specific positioning of polygons relative to one another.

Visible Area Model

There are two types of statistical process models: edge bias models and threshold models. OPC typically uses threshold type models. Edge bias models are usually etch bias models, but in principle an edge bias model can be used to model resist, lithography, or some other combination of semiconductor manufacturing processes.

A visible area model determines the proximity effect at an evaluation point using a visible area associated with the evaluation point.

Figure 3:
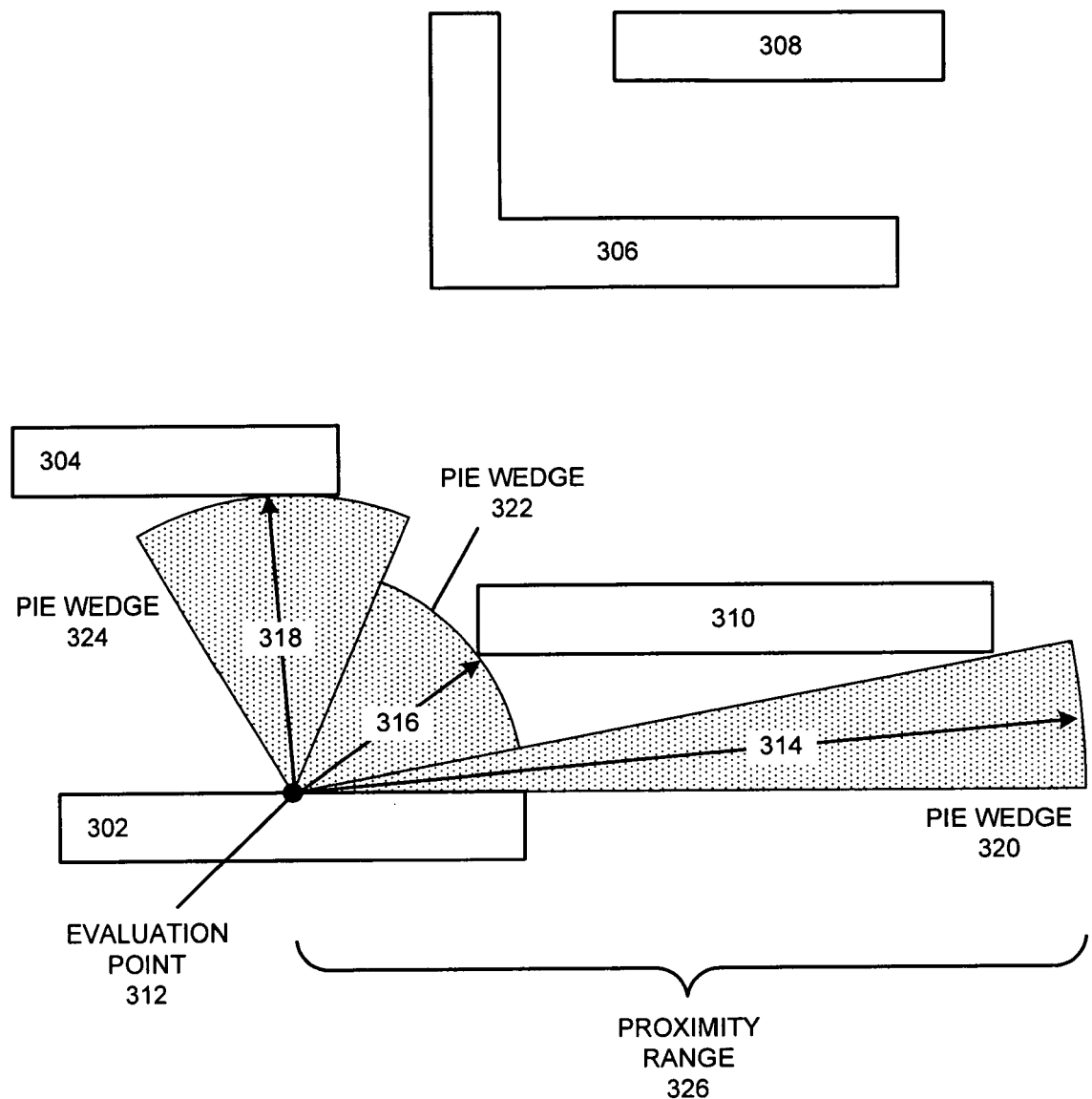
FIG. 3 illustrates how the visible area for an evaluation point can be determined in accordance with an embodiment of the present invention.

FIG. 3 illustrates how the visible area for an evaluation point can be determined in accordance with an embodiment of the present invention.

Figure 7:
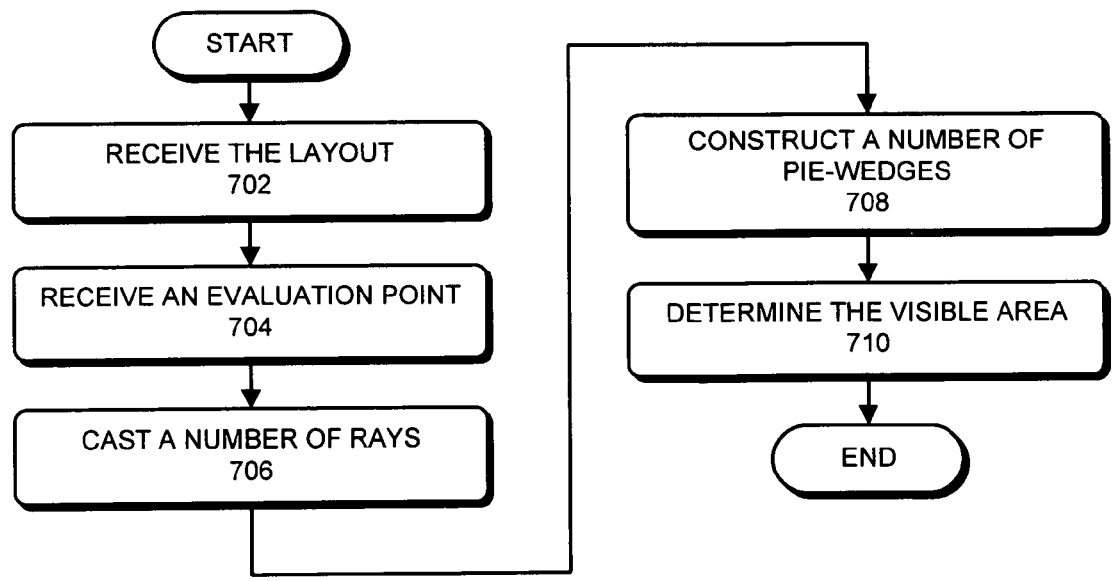
FIG. 7 presents a flowchart that illustrates a process for determining the visible area for an evaluation point in accordance with an embodiment of the present invention.

FIG. 7 presents a flowchart that illustrates a process for determining the visible area for an evaluation point in accordance with an embodiment of the present invention.

The process usually begins by receiving a layout (step 702).

For example, in FIG. 3, polygons 302, 304, 306, 308, and 310, belong to a portion of an integrated circuit layout.

Next, the system receives an evaluation point (step 704).

The evaluation point can be located at any point within the layout. In FIG. 3, evaluation point 312 is located on polygon 302's edge.

The system then casts a number of rays from the evaluation point (step 706).

For example, the system can cast rays 314, 316, and 318, from evaluation point 312. In one embodiment of the present invention, the rays are cast at uniform angular increments from the evaluation point.

The rays usually extend until they either intersect an edge of a neighboring polygon, or they reach the proximity range 326, which is defined as the maximum length for which a ray is allowed to extend. (Later in this application we describe a situation in which a ray can continue to extend beyond the intersection point with a polygon's edge.)

For example, ray 318 extends till it intersects an edge of polygon 304. On the other hand, ray 314 does not intersect an edge of a polygon, but reaches the proximity range 326.

Next, the system constructs a number of pie-wedges using the rays (step 708).

For example, the system can construct pie-wedges 320, 322, and 324, based on the rays 314, 316, and 318, respectively. The radius of a pie wedge, such as pie wedge 320, is equal to the length of the corresponding ray 314. In one embodiment, a ray bisects the angle of the associated pie wedge.

The system then determines the visible area using the pie wedges (step 710).

The system can then use the visible area to determine a proximity correction. Specifically, the system can use a statistical process model which contains a term that uses the visible area.

For example, the system can compute a surface integral of a statistical function over the visible area. Next, the system can normalize or calibrate the value of the surface integral, and use the normalized or calibrated value as one of the terms in the statistical process model.

In one embodiment, the statistical function, $f$, is defined as $f(r,\theta)=a/r$, where r is a radial distance from the evaluation point, $\theta$ is the angle between a ray and a reference line that passes through the evaluation point, and a is a free parameter that is calibrated so that the surface integral accurately models the semiconductor manufacturing processes.

In another embodiment, the statistical function, $f$, is a Gaussian function, which is defined as $$f(r, \theta) = ae^{-\left(\frac{r}{b}\right)^2},$$

where r is a radial distance from the evaluation point, $\theta$ is the angle between a ray and a reference line that passes through the evaluation point, and a, b are free parameters that are calibrated so that a surface integral of the statistical function accurately models the semiconductor manufacturing processes.

Extinction Length

An integrated circuit layout can be represented using polygons or pixel-maps. In a polygon layout, a proximity correction system typically dissects the polygons into edges and vertices, and then computes the proximity correction using these edges and vertices. On the other hand, in a pixel-map layout, proximity correction systems usually use digital image processing techniques to compute the proximity correction.

The extinction length concept is useful when the visible area model is used in a threshold type process model for a polygon layout. The reason for using the extinction length concept is that the 2-dimensional surface returned by the threshold model must be continuous at polygon edges, and it must have a slope which is not too large. Note that the threshold is the "knob" that is turned to fit the process model to the empirical process data, which is obtained by measuring feature dimensions of the layout when the layout is printed on silicon. If the slope of the 2-dimension function is very large or infinite at the edge of a polygon, turning the knob has little or no effect on fitting the process model to the empirical process data. That is why we need to use an extinction length to ensure that the 2-dimension visible area function is continuous at polygon edges, which, in turn, ensures that the threshold "knob" does its job when the process model is fitted to the empirical process data. Note that the extinction length concept is a very important aspect of the present invention.

In one embodiment, when a ray intersects a polygon, the system uses an extinction length (or distance) to determine whether to terminate the ray at the intersection point or whether to let the ray extend beyond the intersection point.

Figure 4A:
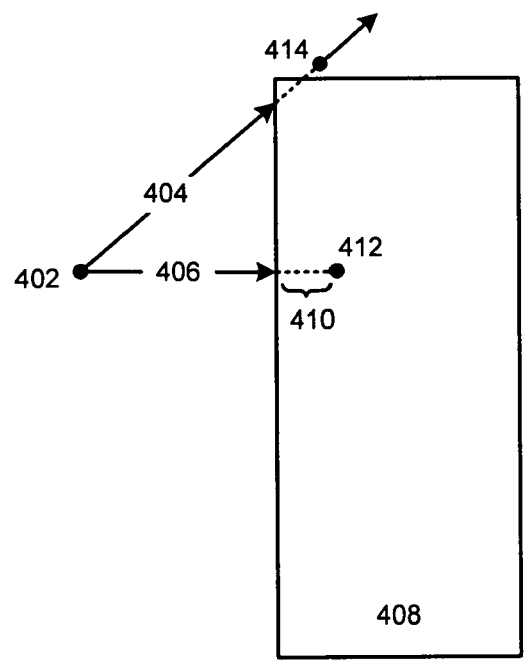
FIG. 4A illustrates how an extinction length can be used to determine whether to terminate a ray in accordance with an embodiment of the present invention.

FIG. 4A illustrates how an extinction length can be used to determine whether to terminate a ray in accordance with an embodiment of the present invention.

Consider rays 404 and 406, which are cast from evaluation point 402 and which intersect with polygon 408's edge. Instead of terminating the rays at the polygon's edge, the system can proceed into the polygon along the rays by a distance of one extinction length to reach an extension point. For example, the system can proceed into polygon 408 along ray 406 by extinction length 410 to reach extension point 412. Similarly, the system can proceed into the polygon 408 along ray 404 by one extinction length to reach extension point 414.

Next, the system determines whether the extension point is inside the polygon. If the extension point is inside the polygon, the system can terminate the ray at the intersection point between the ray and the polygon. For example, since extension point 412 is inside polygon 408, the system can terminate ray 406 at the intersection point between ray 406 and polygon 408's edge.

On the other hand, if the extension point is outside the polygon, the system can continue to extend the ray as if the ray never intersected with the polygon. For example, since extension point 414 is outside polygon 408, the system can extend ray 404 beyond polygon 408 as if ray 404 never intersected with polygon 408.

If the evaluation point is located inside a polygon, the visible area is determined in a similar fashion using the extinction length.

Figure 4B:
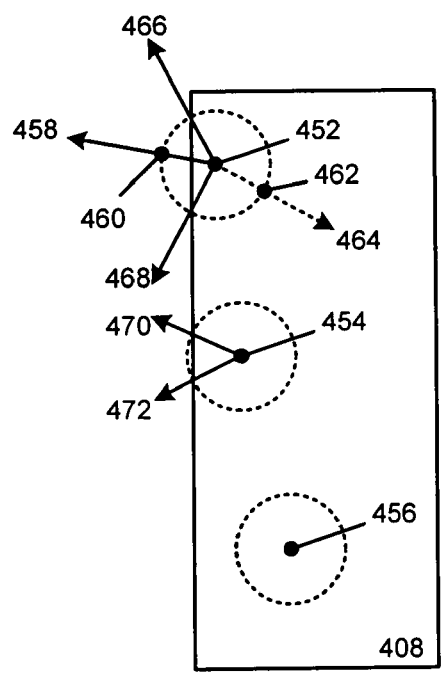
FIG. 4B illustrates how an extinction length can be used to determine a visible area for an evaluation point which is located inside a polygon in accordance with an embodiment of the present invention.

FIG. 4B illustrates how an extinction length can be used to determine a visible area for an evaluation point which is located inside a polygon in accordance with an embodiment of the present invention.

Ray 458 is cast from evaluation point 452 which is located inside polygon 408. Extension point 460 is at a distance of one extinction length from evaluation point 452 along ray 458. Since extension point 460 is outside the polygon, the system extends ray 458 as if it never intersected with polygon 408's edge.

On the other hand, if the extension point is inside the polygon, the system does not extend the ray at all. For example, extension point 462 is at a distance of one extinction length from evaluation point 452 along ray 464. Since extension point 462 is located inside polygon 408, the system terminates ray 464 at the evaluation point itself, i.e., for all practical purposes, ray 464 (shown by a dashed line) does not exist.

Note that all rays that are cast from evaluation point 452 and that lie between rays 466 and 468 extend beyond the polygon. All other rays that are cast from evaluation point 452 are terminated at the evaluation point itself.

Similarly, all rays that are cast from evaluation point 454 and that lie between rays 470 and 472 extend beyond the polygon. All other rays that are cast from evaluation point 454 are terminated at the evaluation point itself.

All rays that are cast from evaluation point 456 are terminated at the evaluation point itself. This is because the distance from evaluation point 456 to any of the polygon's edges is greater than one extinction length.

Figure 5A:
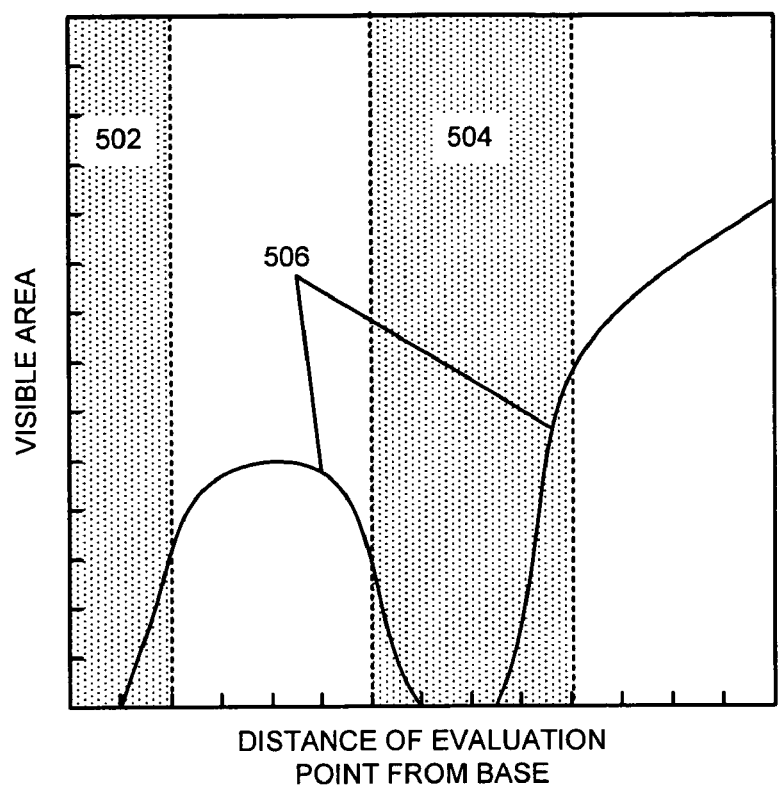
FIG. 5A illustrates a plot of the visible area against the location of the evaluation point in accordance with an embodiment of the present invention.

FIG. 5A illustrates a plot of the visible area against the location of the evaluation point in accordance with an embodiment of the present invention.

The distance of the evaluation point from a base location is plotted along the X-axis, and the visible area is plotted along the Y-axis. Note that the visible area curve 506 is continuous as the evaluation point passes through the edges of polygons 502 and 504. This is because we used an extinction length to determine the visible area. If we had not used an extinction length, the visible area curve would have changed value abruptly at the edge of the polygon, which may have made the visible area function a less effective or ineffective component in a threshold type process model.

The visible area can be represented by a continuous 2-dimensional function whose value at a point in the layout is equal to the area that is visible from that point. We can generate a contour by comparing this 2-dimensional function with a threshold. (FIG. 5A essentially plots the value of the 2-dimensional visible area function along a straight line in the layout.)

Figure 5B:
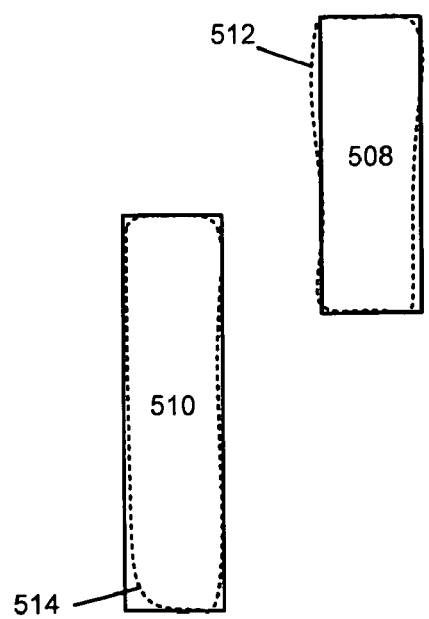
FIG. 5B illustrates how a contour can be generated by comparing a visible area function with a threshold in accordance with an embodiment of the present invention.

FIG. 5B illustrates how a contour can be generated by comparing a visible area function with a threshold in accordance with an embodiment of the present invention.

Polygons 508 and 510 belong to a layout. As illustrated in FIG. 5B, smooth, continuous contours 512 and 514 can be generated by applying a threshold to a model which only contains a 2-dimension visible area term. Since the visible area term generates well-behaved contours, this term can be added to a statistical process model (e.g., OPC model) which usually contains constant terms and linear convolution terms. Since the visible area term is statistically independent from the linear convolution terms, it can improve the fit of a statistical process model (e.g., an OPC model). Improving the fit of the statistical model can improve the effectiveness of the proximity correction.

In one embodiment, the 2-dimensional visible area function is used in a statistical process model. The advantage of using a 2-dimensional visible area function is that it can help the statistical process model to model the behavior of semiconductor manufacturing processes whose effect at a location in the layout depends on the area that is visible from that location. As was mentioned before, prior art techniques that are based on linear convolution are not able to model such semiconductor manufacturing processes.

Process of Determining a Visible Area in a Pixel-Map Layout

At low feature densities, proximity correction techniques that use a polygon layout usually outperform pixel-map based techniques. However, at high feature densities, pixel-map based techniques tend to perform better than polygon based techniques.

A pixel-map is a 2-dimensional array of pixels. Each pixel can be associated with an attribute, such as, a grayscale value which can be visually depicted by a shade of gray.

Figure 6:
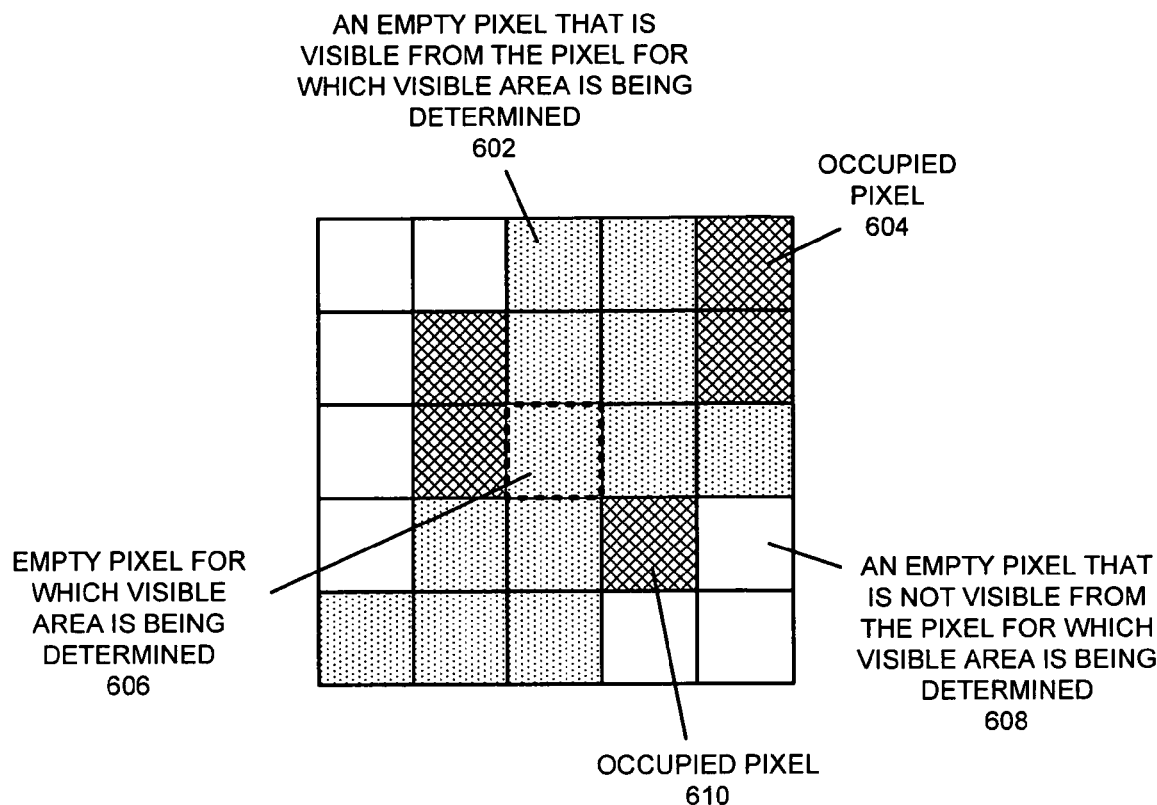
FIG. 6 illustrates a layout which is represented using a pixel-map in accordance with an embodiment of the present invention.

FIG. 6 illustrates a layout which is represented using a pixel-map in accordance with an embodiment of the present invention.

Crosshatched pixels, such as pixels 604 and 610, are associated with regions of the layout that contain a polygon. Pixels that are not crosshatched, such as pixels 602, 606, and 608, are associated with regions of the layout that do not contain polygons. (Although pixels in FIG. 6 are illustrated using patterns for sake of clarity, in reality they are usually associated with a grayscale value, not a pattern.)

Figure 8:
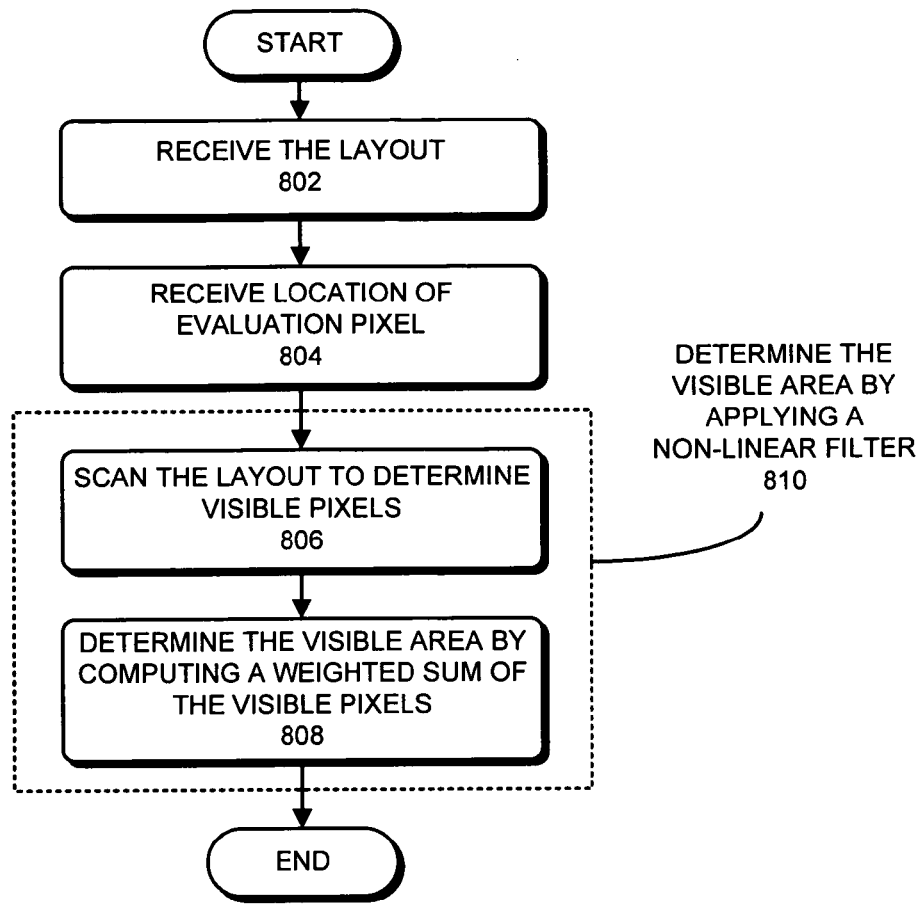
FIG. 8 presents a flowchart that illustrates a process for determining a visible area in a pixel-map layout in accordance with an embodiment of the present invention.

FIG. 8 presents a flowchart that illustrates a process for determining a visible area in a pixel-map layout in accordance with an embodiment of the present invention.

The process usually begins by receiving a pixel-map layout (step 802). For example, the system can receive a pixel-map layout as shown in FIG. 6.

Next, the system receives a location of an evaluation pixel (step 804). For example, the system can receive the location of pixel 606 for which the visible area is to be determined.

The system then determines the visible area for the evaluation pixel by applying a non-linear filter (step 810). Note that the visible area can be used in an edge bias model or in a threshold model.

For example, the system can determine the visible area which is represented in FIG. 6 using lightly shaded pixels, such as pixel 602. Pixel 608 is not visible from the evaluation pixel 606 because occupied pixel 610 is blocking the view from the evaluation point.

A non-linear filter can be defined using the definition of a linear filter. Let H be an operator whose input and output are pixel-maps (or digital images). H is said to be a linear operator (or filter) if, for any two images f and g and any two scalars a and b, the following identity holds:

$$H(a \times f + b \times g) = a \times H(f) + b \times H(g).$$

In other words, the result of applying a linear filter to the sum of two images (that have been multiplied by the constants as shown above) is identical to applying the operator to the images individually, multiplying the results by the appropriate constants, and then adding those results. An operator or filter that does not satisfy the above identity is by definition a non-linear operator or filter.

In one embodiment, the system applies the non-linear filter by first scanning the layout to determine a set of visible pixels from the evaluation pixel (step 806).

It will be apparent to one skilled in the art that a number of scanning techniques can be used to determine the set of visible pixels in a pixel-map layout.

The system then determines the visible area by computing a weighted sum of the set of visible pixels (step 808).

Figure 9:
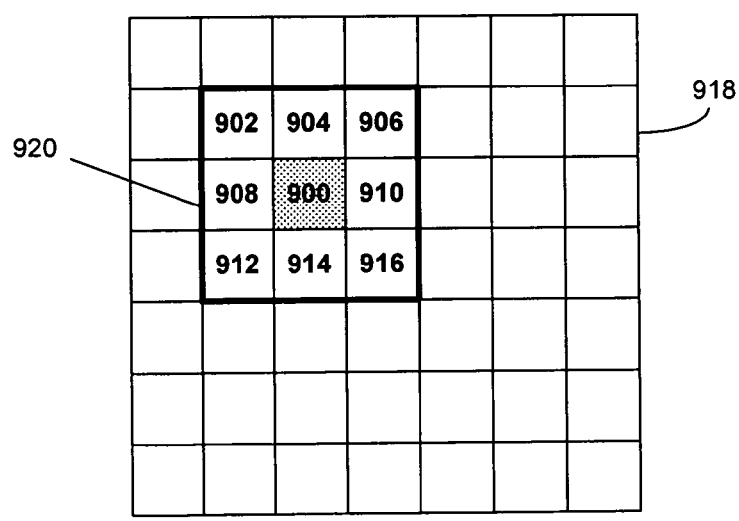
FIG. 9 illustrates how a filter can be applied to a pixel-map layout in accordance with an embodiment of the present invention.

FIG. 9 illustrates how a filter can be applied to a pixel-map layout in accordance with an embodiment of the present invention.

A pixel-map layout (which can be represented by a digital image) usually comprises a number of pixels. For example, FIG. 9 illustrates a portion 918 of a pixel-map layout that comprises a number of pixels, which include pixels 902, 904, 906, 908, 910, 912, 914, and 916. Each pixel can be associated with one or more attributes. For example, a pixel is usually associated with a grayscale value which indicates whether the region in the layout that is associated with the pixel contains a polygon or not.

When a filter is applied to a pixel-map layout, it computes an attribute value for the evaluation pixel based on the current attribute values of the evaluation pixel and the attribute values of neighboring pixels. Note that a filter typically has a radius (or region of interest) which identifies the neighboring pixels that are to be used in the computation. For example, the filter's computation may be restricted to the pixels within the rectangular region 920 shown in FIG. 9.

A filter is typically applied to a pixel-map layout (or digital image) by convolving a kernel, such as kernel 922, with the pixel-map layout. Kernel 922 comprises kernel coefficients $K_{11}$, $K_{12}$, $K_{13}$, $K_{21}$, $K_{22}$, $K_{23}$, $K_{31}$, $K_{32}$, and $K_{33}$. In one embodiment, the attribute value for evaluation pixel 900 in FIG. 9 may be computed by centering kernel 922 on evaluation pixel 900, and summing the products of the pixel values with their corresponding kernel coefficients. For example, pixel 902's value is multiplied with its corresponding kernel coefficient $K_{11}$, pixel 904's value is multiplied with its corresponding kernel coefficient $K_{12}$, and so forth. These product terms are then added up to obtain the new value for pixel 900.

In one embodiment, the kernel coefficients of the non-linear filter are determined based on whether the pixel associated with a kernel coefficient is visible from the evaluation pixel or not.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The above disclosure is not intended to limit the present invention. Specifically, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art.

For example, although we disclose a particular approach to generate a visible area model that is continuous at polygon edges, it will be apparent that other approaches can also be used to achieve the same effect. Specifically, the present invention is not limited to using the extinction length based approach.

The scope of the present invention is defined by the appended claims.

What is claimed is:

1. A method for determining a proximity correction, the method comprising:
   receiving a layout;
   receiving an evaluation point within the layout;

determining a visible area associated with the evaluation point, wherein the visible area associated with the evaluation point is an area within the layout that is visible from the evaluation point, wherein a second point in the layout is visible from the evaluation point if a straight line between the second point and the evaluation point does not overlap with a neighboring polygon over a distance that is greater than an extinction length; and determining a proximity correction using the visible area.

2. The method of claim 1, wherein determining the visible area involves:

casting rays from the evaluation point;
constructing pie-wedges using the rays; and
determining the visible area using the pie-wedges.

3. The method of claim 2, wherein casting the rays involves casting rays at uniform angular increments from the evaluation point.

4. The method of claim 2, wherein casting rays from the evaluation point involves:

extending a first ray from the evaluation point until the first ray intersects a first edge of a first polygon;
determining an extension point along the first ray by proceeding into the first polygon by a distance that is equal to an extinction length; and
if the extension point is inside the first polygon, terminating the first ray at a point where the first ray intersects the first edge;
otherwise, if the extension point is outside the first polygon, extending the first ray beyond the extension point.

5. The method of claim 1, wherein the extinction length is substantially equal to zero.

6. The method of claim 1,
wherein the layout is represented using a pixel-map;
wherein the evaluation point is specified using an evaluation pixel within the pixel-map; and
wherein determining the visible area involves applying a non-linear filter to the pixel-map.

7. The method of claim 6, wherein applying the non-linear filter involves:

scanning the pixel-map to identify pixels that are visible from the evaluation pixel; and
determining the visible area by computing a weighted sum of the visible pixel values.

8. A computer-readable storage-medium storing instructions that when executed by a computer cause the computer to perform a method for determining a proximity correction, the method comprising:

receiving a layout;
receiving an evaluation point within the layout;
determining a visible area associated with the evaluation point, wherein the visible area associated with the evaluation point is an area within the layout that is visible from the evaluation point, wherein a second point in the layout is visible from the evaluation point if a straight line between the second point and the evaluation point does not overlap with a neighboring polygon over a distance that is greater than an extinction length; and
determining a proximity correction using the visible area.

9. The computer-readable storage-medium of claim 8, wherein determining the visible area involves:

casting rays from the evaluation point;
constructing pie-wedges using the rays; and
determining the visible area using the pie-wedges.

10. The computer-readable storage-medium of claim 9, wherein casting the rays involves casting rays at uniform angular increments from the evaluation point.

11. The computer-readable storage-medium of claim 9, wherein casting rays from the evaluation point involves:

extending a first ray from the evaluation point until the first ray intersects a first edge of a first polygon;
determining an extension point along the first ray by proceeding into the first polygon by a distance that is equal to an extinction length; and
if the extension point is inside the first polygon, terminating the first ray at a point where the first ray intersects the first edge;
otherwise, if the extension point is outside the first polygon, extending the first ray beyond the extension point.

12. The computer-readable storage-medium of claim 8, wherein the extinction length is substantially equal to zero.

13. The computer-readable storage-medium of claim 8,
wherein the layout is represented using a pixel-map;
wherein the evaluation point is specified using an evaluation pixel within the pixel-map; and
wherein determining the visible area involves applying a non-linear filter to the pixel-map.

14. The computer-readable storage-medium of claim 13, wherein applying the non-linear filter involves:

scanning the pixel-map to identify pixels that are visible from the evaluation pixel; and
determining the visible area by computing a weighted sum of the visible pixel values.

* * * * *